United States Patent [19]
Renner, Jr.

[11] Patent Number: 6,032,269
[45] Date of Patent: Feb. 29, 2000

[54] FIRMWARE RECOVERY FROM HANGING CHANNELS BY BUFFER ANALYSIS

[75] Inventor: William F. Renner, Jr., Baltimore, Md.

[73] Assignee: Digi-Data Corporation, Jessup, Md.

[21] Appl. No.: 09/108,016

[22] Filed: Jun. 30, 1998

[51] Int. Cl.$^7$ ...................................................... G06F 11/00
[52] U.S. Cl. .............................................................. 714/37
[58] Field of Search ................................. 714/5, 6, 8, 13, 714/37, 702, 704, 707; 709/235

[56] References Cited

U.S. PATENT DOCUMENTS

| | | | |
|---|---|---|---|
| 4,490,817 | 12/1984 | Turner | 714/704 |
| 5,455,934 | 10/1995 | Holland et al. | 714/6 |
| 5,469,548 | 11/1995 | Callison et al. | 711/114 |
| 5,537,567 | 7/1996 | Galbraith et al. | 714/6 |
| 5,598,578 | 1/1997 | Hatta . | |
| 5,604,866 | 2/1997 | Kolb . | |
| 5,619,675 | 4/1997 | De Martine . | |
| 5,640,604 | 6/1997 | Hirano . | |
| 5,768,623 | 6/1998 | Judd et al. | 714/5 |

OTHER PUBLICATIONS

Pankaj Jalote, Fault Tolerance in Distributed Systems, Section 3.3.1 Problem Definition, pp. 100–101. 1994 P T R Prentice Hall.

*Primary Examiner*—Robert W. Beausoliel, Jr.
*Assistant Examiner*—Pierre Eddy Elisca
*Attorney, Agent, or Firm*—William S. Ramsey, Ph.; Pepper Hamilton LLP

[57] ABSTRACT

This invention provides a software-based method for determining the identity of a failed (hanging) channel in an array of multiple, buffered, synchronized data channels. A hanging channel may stem from a failed storage unit in the channel, a faulty connection within the channel, or a fault in the interface circuitry which connects the channel with the synchronization hardware. It is necessary and useful to identify a hanging channel in order to isolate it (as in a RAID 2–5 system) or for repair. The hanging channel is detected by examination of the byte content of the buffers. If the system is in a read mode, the buffer serving the hanging channel will contain substantially more bytes than the other buffers. If the system is in the write mode, the buffer serving the hanging channel will contain substantially fewer bytes than the other buffers.

24 Claims, 8 Drawing Sheets

FIRMWARE RECOVERY FROM HANGING CHANNELS BY BUFFER ANALYSIS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION (1) Field of the Invention

This invention relates to means for detecting the identity of a channel containing a faulty data storage unit in a data-storage system in which multiple data storage units are arrayed in channels and are buffered and synchronized by a hardware mechanism which handshakes simultaneously with all of the channel buffers.

(2) Description of Related Art Including Information Disclosed Under 37 CFR 1.97 and 37 CFR 1.98.

In an architecture where multiple channels of data from independent sources are synchronized, buffered, and merged by hardware, the presence of a channel hanging in its data-transfer phase can freeze the transfer without any explicit indication of which might be the faulty channel.

A variety of failures can occur in a disk storage system. RAID systems generally are able to tolerate many errors by techniques which use coding. Some failures cannot be handled, and are classified as follows. 1. Transient failures. Unpredictable behavior of a disk for a short time. 2. Bad sector. A portion of a disk which cannot be read, often for physical reasons. 3. Controller failure. The disk contents are unaffected, but because of controller failure, the disk cannot be read. 4. Disk failure. The entire disk becomes unreadable, generally due to hardware faults such as a disk head crash. Pankaj Jalote, Fault Tolerance in Distributed systems, Prentice hall, Englewood Cliffs, N.J., 1994, pages 100–101.

In a RAID 1–5 system with single-channel fault-tolerance, for example, it is desirable to isolate the faulty channel and continue system operation without it. Other systems using multiple synchronized buffered independent channels, such as an array of distributed sensors from which signals are merged in hardware before processing also require detection of faulty channels so the system can function in their absence. Such arrayed distributed sensors would involve merging of signals and computation in hardware, in order to provide redundancy, so that faulty channels may be excluded. There is a need for a simple, efficient method for detecting faulty channels in such systems.

RAID 1–5 systems are characterized by several external data channels which may be buffered and synchronized by a hardware mechanism which handshakes simultaneously with all of the channel buffers. Such a mechanism enforces synchronization. It is especially useful in achieving high performance when data are byte-striped or hardware is used to overcome the write-parity-generation penalty. In the case of a channel hang or failure, it is important to determine which channel is at fault, because the fault may stem from the interface circuitry for the channel, the device connected to the channel (in a RAID system, a storage disk), or a faulty connection within the channel itself.

The usual mechanism for detecting a hang condition is a timeout. In this case, the microprocessor controlling the transfer will set a timer at the beginning, and if the timer runs out before the transfer is completed, it is assumed that a hang condition exists somewhere in the system. Unfortunately, synchronization hardware does not distinguish between the individual channel handshaking signals. The usual mechanism does not indicate which channel in the array has ceased to handshake (or where in the interface circuitry leading from the individual channels a fault is located).

U.S. Pat. No. 5,598,578 discloses a process for discriminating between event words which report temporary channel path errors from event words of higher significance requiring a system reset completion. This system is used to avoid the situation of a event word buffer which is overwhelmed by minor errors and fails to store and report the indication of errors of higher significance.

U.S. Pat. No. 5,640,604 discloses a buffer reallocation system which accesses the amount of used and unused buffer areas in the buffer store and assigns buffers to programs which request buffers.

U.S. Pat. No. 5,604,866 discloses a system for controlling the flow of data to a buffer in which the receiver sends a signal for each free space in its buffer. The sender keeps track of the count and when the buffer is full, the sender will send additional data only after receiving signals from the receiver indicating additional free space in the buffer.

U.S. Pat. No. 5,619,675 discloses a cache buffer management system in which a history table is used to indicate which of several buffers is less recently referenced. The less referenced buffer is then eligible for overwriting.

U.S. Pat. No. 5,604,866 discloses a system for controlling the transmission of messages of a predetermined size from a CPU to a buffer for an I/O device, which buffer has a capacity for a predetermined number of messages. A counter on the CPU notes the number of messages sent to each buffer and sends messages only when the buffer has the capacity to accept the message.

None of the prior art devices provide a software-based method for determining the location of a defective channel. This invention allows one to determine which channel is defective in the event of a channel failure, whether two or more than two channels are involved.

BRIEF SUMMARY OF THE INVENTION

This invention is a process for detecting a channel containing a faulty storage device or faulty circuitry connecting a channel with synchronization hardware (hanging channel) in a multiple storage device system in which storage devices are arrayed in at least two channels and each channel is served by a single buffer and all channels are synchronized by hardware and connected to the hardware. The process determines the hanging channel by determining the condition of the buffer which serves each channel. On a read, one buffer (which serves the hanging channel) will be empty and not handshaking with the synchronization hardware because that buffer has no data to provide. On a write, one buffer (which serves the hanging channel) will be full and not handshaking with the synchronization hardware because it has no space for incoming data.

This principle is used in determining the hanging channel in a two channel system, such as a RAID 1 system. Here a hanging channel is detected in the read mode by determining which buffer is empty or contains the least data. A hanging channel is detected in the write mode by determining which buffer is full or contains the most data.

In a system comprising at least three channels, each channel served by a single buffer, and all channels synchronized by hardware and connected to the hardware, the process comprises the following steps. Determining the byte count for each buffer. Comparing the byte counts in each buffer. Determining the buffer whose byte count diverges most from the other byte counts. Designating the buffer whose byte count diverges most from the other buffer byte counts as a channel containing a faulty storage device or faulty circuitry connecting the channel with the synchronization hardware.

In a system containing two channels, each channel served by a single buffer, and both channels synchronized by hardware and connected to the hardware, the process in a read mode comprises the following steps. Determining the byte count for each buffer. Comparing the bytes counts in each buffer. Determining the buffer whose byte count is lowest. Designating the buffer whose byte count is lowest as a channel containing a faulty storage device or faulty circuitry connecting the channel with the synchronization hardware.

In a system containing two channels, each channel served by a single buffer, and both channels synchronized by hardware and connected to the hardware, the process in a write mode comprises the following steps. Determining the byte count for each buffer. Comparing the bytes counts in each buffer. Determining the buffer whose byte count is highest. Designating the buffer whose byte count is highest as a channel containing a faulty storage device or faulty circuitry connecting the channel with the synchronization hardware.

The objective of this invention is to provide a software dependent method for identifying a faulty channel in computer architecture where multiple channels of data from independent sources are synchronized, buffered, and merged by hardware.

Another objective is to provide such a method which is rapid, efficient, and dependable.

Another objective is to provide such a method which does not require modification of hardware.

A final objective is to provide such a method which is inexpensive and without adverse effect on the environment.

DETAILED DESCRIPTION OF THE INVENTION.

Figure 1:
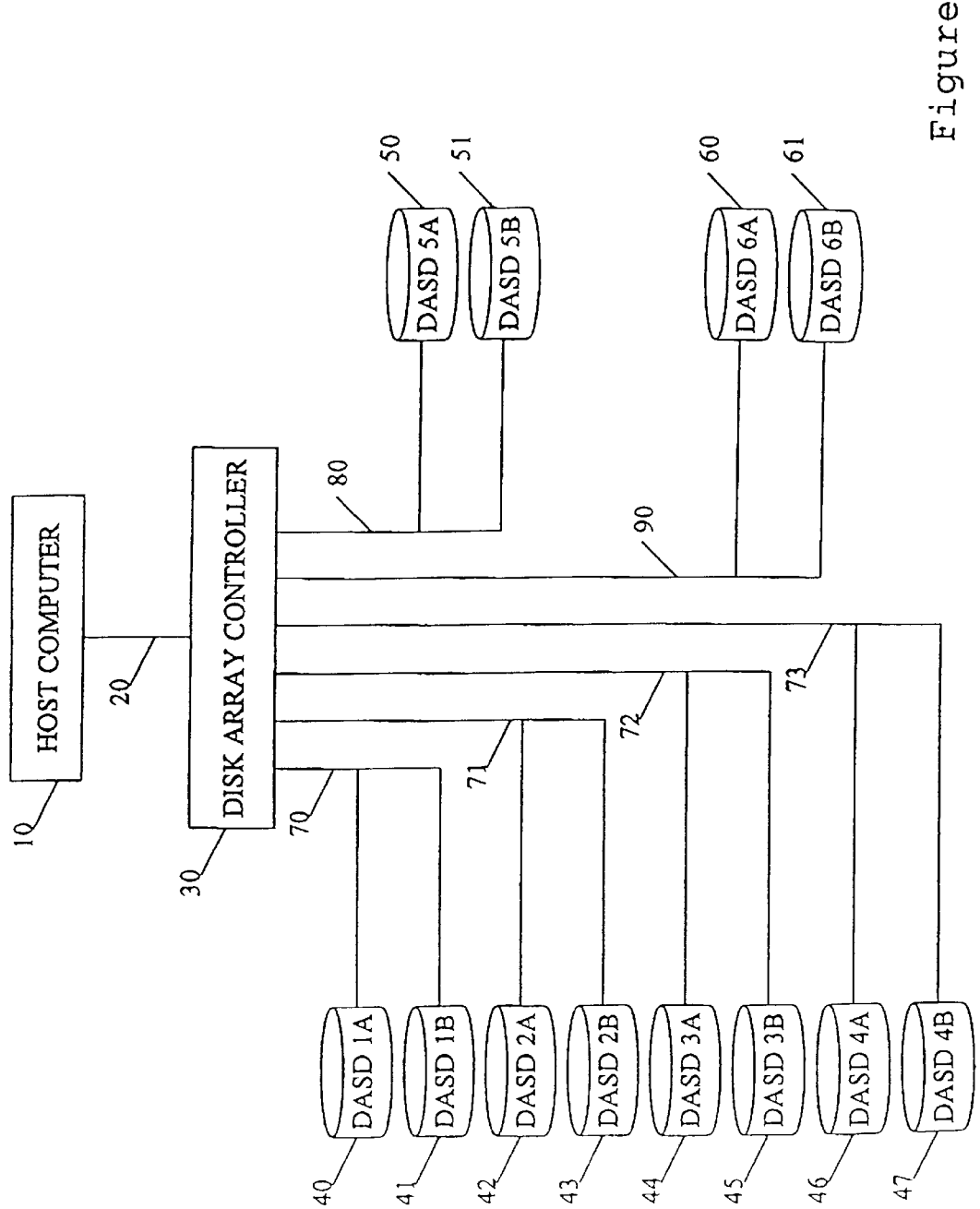
FIG. 1 is a schematic of the external view of the array, disk array controller, and host computer.

FIG. 1 is a schematic of the external view of a RAID 3 system comprising a single host computer, a RAID controller, and two tiers of 5 Direct Access Storage Device (DASD) units with two parity DASDs and two additional hot-spare DASDs which incorporates the invention. All the DASDs in a system taken as a whole is referred to as an "array" of DASDs. A group of DASDs served by separate channels across which data is striped is referred to as a "tier" of DASDs. A DASD may be uniquely identified by a channel number and a tier letter, for example DASD 1A is the first disk connected to channel 1 of the controller.

A preferred controller is the Z-9100 Ultra-Wide SCSI RAID controller manufactured by Digi-Data Corporation, Jessup Md.

The host computer 10 is connected by the host small computer system interface (SCSI) bus 20 to the disk array controller 30. Disk array controller 30 is connected to DASD 1A 40 and DASD 1B 41 via the channel 1 disk SCSI data bus 70; to DASD 2A 42 and DASD 2B 43 via the channel 2 disk SCSI data bus 71; to DASD 3A 44 and DASD 3B 45 via the channel 3 disk SCSI data bus 72; and to DASD 4A 46 and DASD 4B 47 via the channel 4 disk SCSI data bus 73; respectively. Parity DASD 5A 50 and 5B 51 are connected to the Disk Array Controller 30 by the channel 5 SCSI parity disk bus 80. Spare DASD 6A 60 and 6B 61 are connected to Disk Array Controller 30 by the channel 6 SCSI hot spare disk bus 90.

Additional tiers of DASDs may be used. Additional host channels and host computers may be used on the system.

Any suitable host computer may be used.

Figure 2:
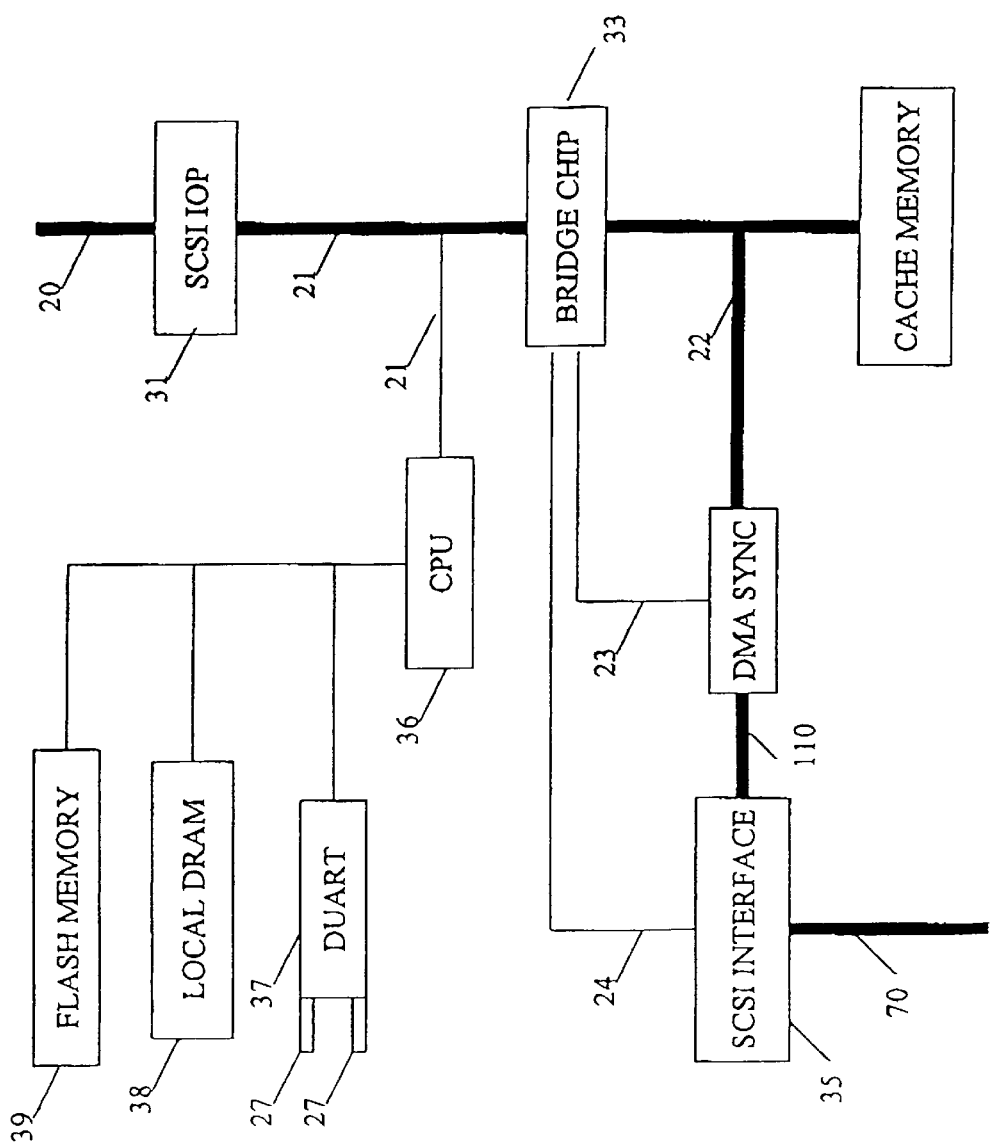
FIG. 2 is a schematic of the system architecture showing only one channel.

FIG. 2 is a schematic of the system architecture of the disk array controller (30 in FIG. 1) showing one disk channel and one host channel only. The flow of data between host and disk array is indicated by the heavy line. Data is received from the host computer via the host SCSI bus 20 into the SCSI input/output processor (SCSI IOP) 31. The SCSI IOP initiates memory transactions to or from the cache memory 32 through the bridge chip 33 which bridges the system bus and the cache bus. A cache bus 22 connects the bridge chip 33, cache memory 32, and the hardware control mechanism DMA Sync 34. The DMA Sync acts as a direct memory access (DMA) controller with the additional RAID-3 finction of parity generation and checking and replacement of data with a hot spare. It also generates reads or writes to specific cache addresses and translates the data between the cache bus 22 and the SCSI interface chip 35 on the individual channel. The DMA Sync also controls the necessary hardware handshaking signals for direct memory access (DMA). Although only one SCSI interface chip 35 and SCSI disk bus 70 is shown in FIG. 2, there are as many of these components as there are busses of DASDs. The SCSI interface chip 35 is connected by connector 24 to bridge chip 33. The DMA Sync 34 is connected by connector 23 to the bridge chip 33. The non-volatile flash electrically erasable programmable read-only memory (EEPROM) 39 stores parameters for the controller and the system firmware, which is uncompressed from the flash into 4 Megabyte local dynamic random-access memory (DRAM) 38 when the system is booted. A DUART chip 37 has two RS-232 connectors 27 which allow the user to configure the unit through a command line interface and also provide communication between the unit and a workstation running debugging software. The flash memory 39, local DRAM 38, DUART chip 37 and CPU 36 and system bus 21 are connected by a processor bus 25. Both the SCSI interface chip 35 and the DMA Sync 34 are programmed by the CPU 36 through the system bus 21 and the bridge chip 33.

A preferred CPU 36 is an Intel 960RP available from Intel Corporation, Santa Clara, Calif. A preferred SCSI IOP 31 is a Symbios SYM53C875 available from Symbios Logic Incorporated, Colorado springs, Colo. A preferred system bus 21 is a 32-bit bus designed in accordance with the Peripheral Controller Interconnect (PCI) specification. A preferred SCSI interface chip 35 is a QLOGIC FAS366U Ultra Wide SCSI interface chip available from QLogic Corporation, Costa Mesa, Calif.

Figure 3:
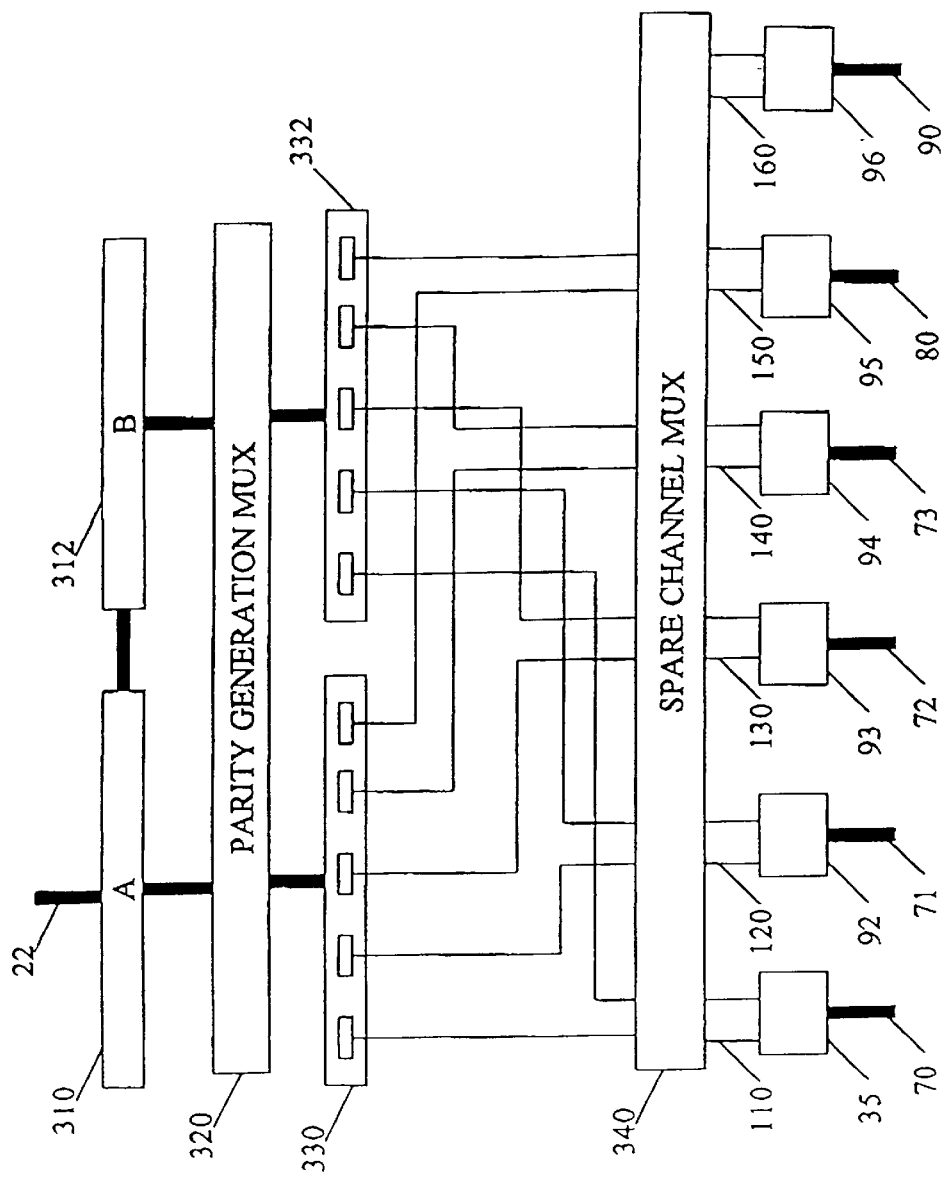
FIG. 3 is a schematic of the DMA sync hardware.

FIG. 3 is a schematic of the DMA sync hardware. The controlling state-machine and related signals and registers, including handshaking signals, are omitted from this schematic. Data enter and exit the DMA sync (34 in FIG. 2) via the cache bus 22 and the individual channel interface chips in the SCSI Interface 35. Data enter and exit the DMA sync (34 in FIG.2) via the cache bus 22 and data buses 110, 120, 130, 140, 150, 160 to the individual channel interface chips 35, 92, 93, 94, 95, 96. During a write from cache to disk, data from the cache bus is latched in two 36 bit registers 310, 312 from which a parity byte is generated by parity-generating circuitry 320. The eight data bytes and two parity bytes are latched in two sets of five 9 bit registers 330, 332. The data are then rearranged to be byte-striped across the disks and are passed to a multiplexor 340 to provide data for the spare channel if it is to be used. For reads from disk to cache the process is reversed.

Figure 4:
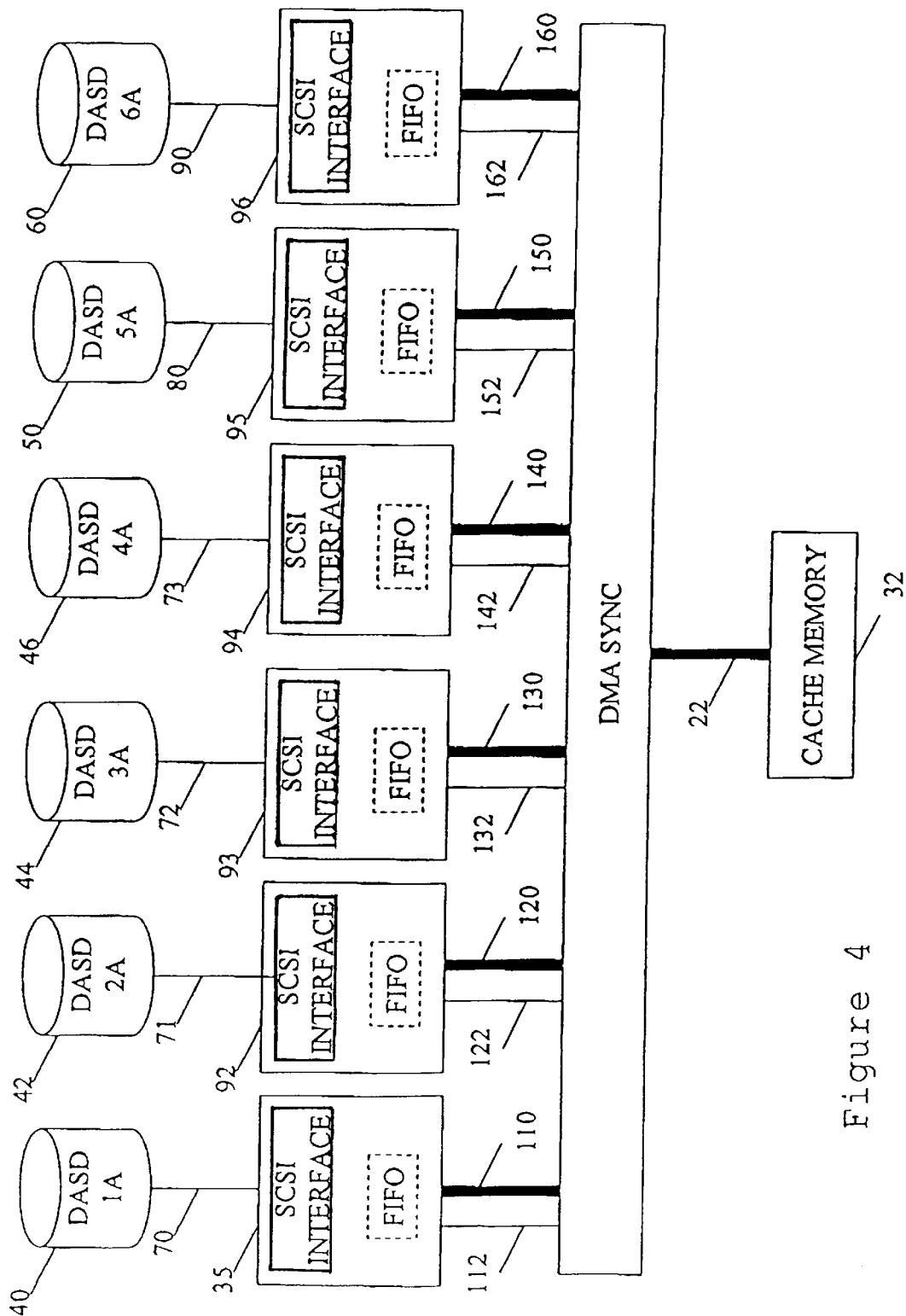
FIG. 4 is a schematic of a system showing the relationships of the components.

FIG. 4 is a schematic showing the relations between the components which emphasizes the relationship between the SCSI Interface FIFO Buffers, the DMA sync, and the array of DASDs. A parity group of DASDs 40, 42, 44, 46, 50 with a hot spare DASD 60 communicate through SCSI channels 70, 71, 72, 73, 80, 90 with the SCSI interface chips 35, 92, 93, 94, 95, 96, each of which contains a FIFO buffer. Each SCSI interface chip exchanges data with the DMA sync on the data buses 110, 120, 130, 140, 150, 160 in a transfer mode synchronized by handshaking signals 112, 122, 132, 142, 152, 162. The DMA sync handshakes with the individual interface chips when data is ready on all channels and translates the data to and from the cache bus 22 as shown in FIG. 3.

Figure 5A:
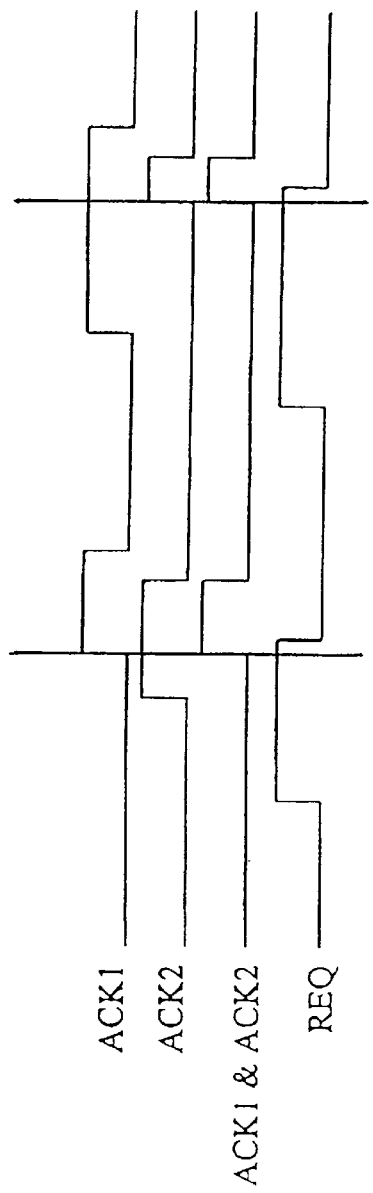
FIG. 5A is a schematic showing the process of identifying a hanging channel in the read case.
Figure 5B:
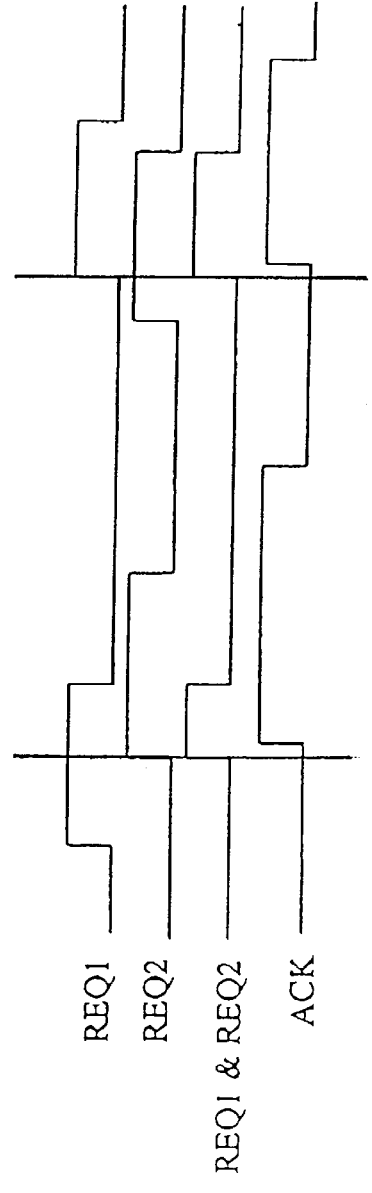
FIG. 5B is a schematic showing the process of identifying a hanging channel in the write case.

FIGS. 5A and 5B are schematics showing the process of identifying a hanging channel.

The present invention is particularly useful in a system in which several external data channels are buffered and synchronized by a hardware mechanism which handshakes simultaneously with all the channel buffers, as in. a RAID-3 system. In such a system, the normal mechanism for detecting the failure of a DASD array to read or write data because of a hang condition is a timeout. In this case, the microprocessor controlling the transfer will set a timer at the beginning, and if the timer runs out, it will be assumed than a hang condition exists somewhere in the system. The problem is that synchronization hardware does not distinguish between the channels' individual handshaking signals, so it cannot be determined which channel is at fault, whether the fault is in the interface circuitry for the channel, in the DASD device or devices which are connected in the channel, or to a faulty connection in the channel itself. The present invention makes it possible to identify which channel is at fault.

A detailed consideration of the handshaking and synchronization mechanism of a synchronized device makes the operation of this invention clear.

FIGS. 5A and 5B shows waveforms of the handshaking which occurs between the SCSI interface chips and the DMA sync, with the read case in FIG. 5A and the write case in FIG. 5B. In these diagrams, a signal designated REQ is asserted by the receiver to request a data word. When the sender has provided the data word, it asserts a signal designated ACK. The receiver releases the REQ signal when the data has been latched, after which the sender releases ACK and the cycle can begin again. In order to synchronize the data, the DMA sync responds to a logical combination the handshaking signals on each channel. In the read case, the logical AND of the ACK signals is shown, whereas in the write case, the logical AND of the REQ signals is shown.

In reading from channel interface chips (CICs), the receiving DMA controller simultaneously asserts a REQ signal to the CICs. Subsequently each CIC asserts an ACK signal which indicates the CIC has presented the requested data. The synchronization mechanism sends the REQ to all channels simultaneously, and responds by releasing the REQ signal only when all of the ACKS are asserted simultaneously, at which time it latches a word of information from each of the CICs. Essentially this means that the handshaking signals on all the channels involved are logically linked together. In the case of failure, it is not possible for the system to identify the channel which is hanging.

In writing to CICs, the receiving CICs assert a REQ signal to the DMA controller. When all of the CICs have asserted REQ, the DMA controller asserts an ACK signal which indicates the DMA controller is sending the requested data. As each CIC latches the data, it releases its REQ signal. The synchronization mechanism responds by releasing the ACK signal only when all the REQs have been deasserted. Again this means that the handshaking signals on all the channels involved are logically linked together. In the case of failure, it is not possible for the system to identify the channel which is hanging.

Although the method of this invention is of greatest value in systems in which the interface circuitry which reads data on an individual channel to or from the buffer cannot be queried directly to determine whether the particular channel is hung, it is also useful in devices in which the individual channels can be queried, since it will also detect faults in the interface circuitry.

In this invention, the hanging DASD channel is located by analyzing the contents of the buffers which serve the channels. In a read mode (reading data from the DASD channels), if one channel is hanging, one buffer will be empty and therefore not handshaking with the synchronization hardware because it has no data to provide because of the defective condition in the channel. In a write mode, if one channel is hanging, one buffer will be full and therefore not handshaking with the synchronization hardware because it has no space to accept data for the hanging channel.

After the hanging channel is identified, a spare channel can be used, if there is a redundant channel in the system. In the case of a RAID system with redundant data available and an available DASD on a spare channel, the data can be reconstituted to that DASD in the event of channel hanging. In the case of a transfer employing five channels, the hanging channel buffer would be the one whose contents differed most from the buffers serving the four other active channels. The invention could be practiced in a system with as few as two channels. If only two channels were available, in the case of a read operation, the hanging channel buffer would containing fewer bytes than the active channel buffer. In the case of a write operation, the hanging channel buffer would contain more bytes than the active channel buffer.

Figure 6A:
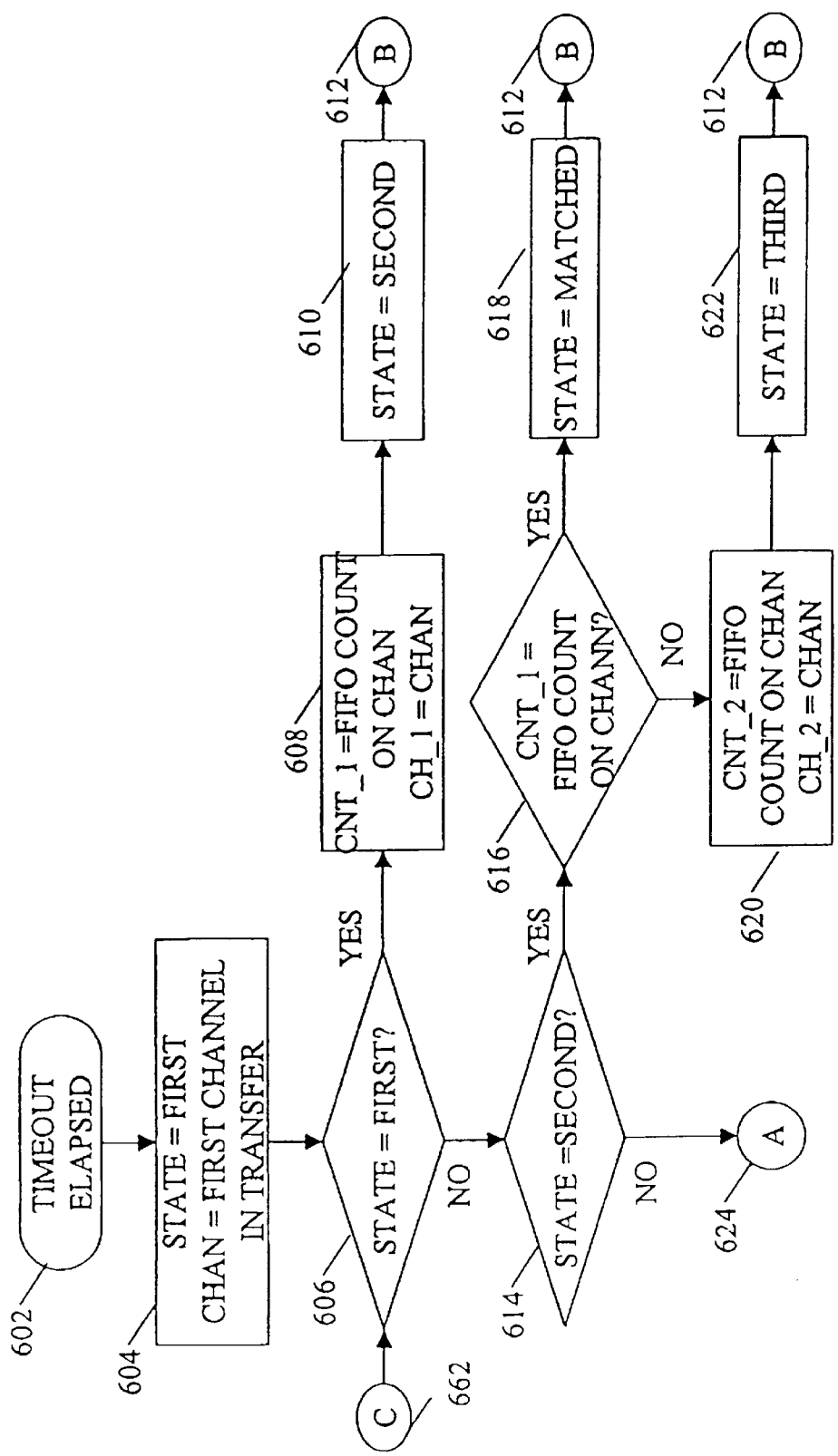
FIGS. 6(a), 6(b) and 6(c) is a flow chart of the system for identifying a channel containing a faulty data storage unit.
Figure 6B:
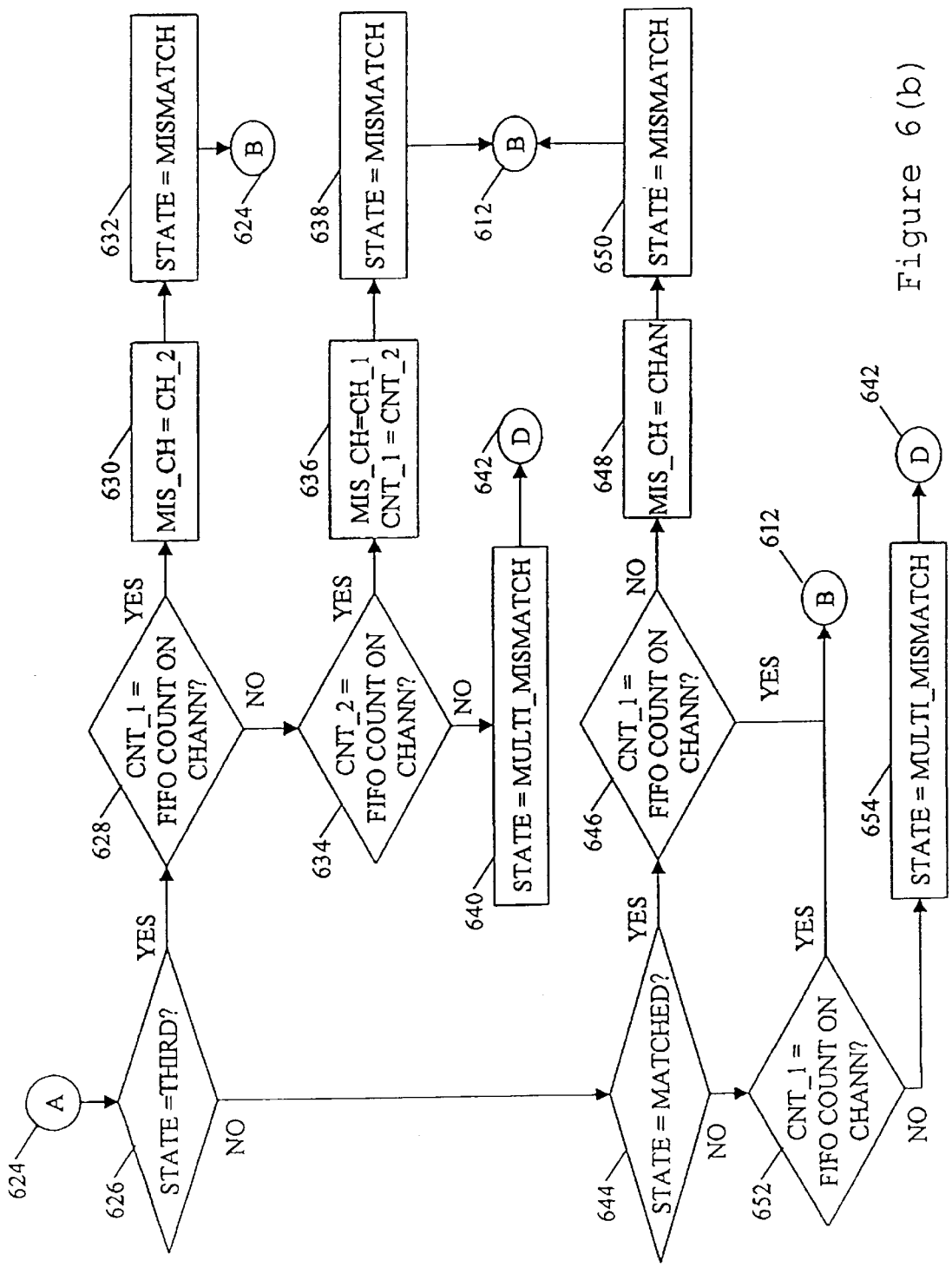
Figure 6C:
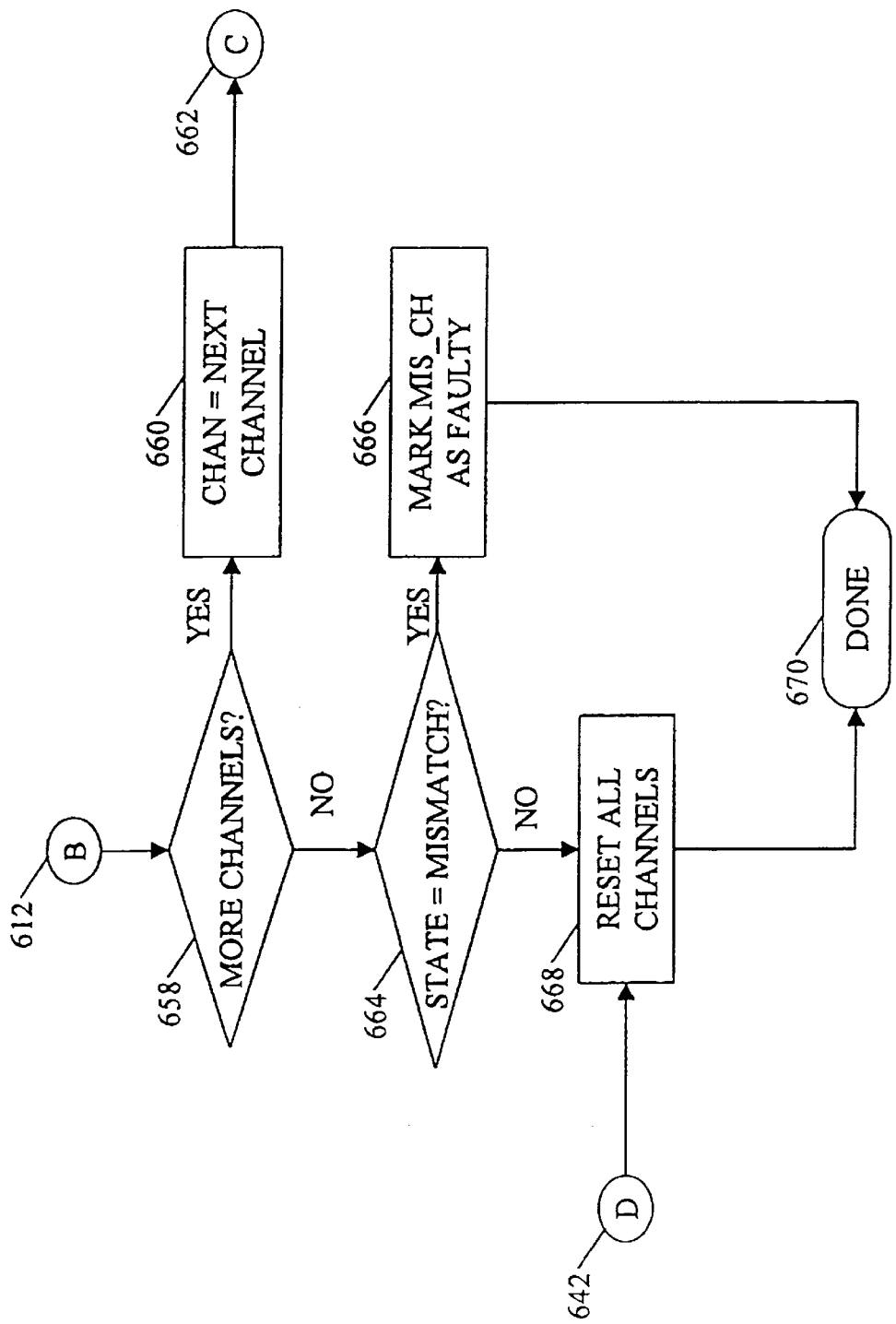

FIG. 6 is a flow chart for a preferred embodiment of the system of this invention.

FIG. 6(a) shows the entry point for routine 602, which is invoked when a software timer set by the microprocessor at the beginning of a data transfer which uses multiple, hardware-synchronized channels has elapsed. In block 604 two variables are initialized which are used to control the routine's main loop, in which the individual channel buffers' byte counts are compared. The variable STATE is an enumeration which can have the values FIRST, SECOND, THIRD, MATCHED, MISMATCH, and MULTI-MISMATCH. The variable CHAN is used as a loop control variable to cycle through each channel participating in the data transfer. Additional variables CH_1, CNT_1, CH_2, and CNT_2 are used to hold the channel numbers and buffer counts of two channels examined in previous iterations of the loop. The additional variable MIS_CH is used to hold the channel number of the channel whose buffer count is determined to have diverged from the others. Depending on the current STATE, which is switched by decision blocks 606 and 614 in FIG. 6(*a*) and decision blocks 626 and 644 in FIG. 6(*b*), the STATE and the variables CNT_1, CNT_2, CH_1, CH_2, and MIS_CH are updated based on the buffer count for the channel indicated by CHAN.

When STATE is FIRST, control passes to block 608 of FIG. 6(*a*). The channel number and buffer count for the first channel involved in the transfer are stored in CH_1 and CNT_1, respectively. The STATE is then set to SECOND in block 610 and control passes to the end of the loop through connector 612.

When STATE is SECOND, control passes to block 616 of FIG. 6(*a*). CNT_1 is compared against the buffer count on the channel indicated by CHANN. If they are identical, the state is set to MATCHED in block 618 and control passes to the end of the loop through connector 612. If the counts are not identical, CHANN and its buffer count are stored in CH_2 and CNT_2, respectively, in block 620, STATE is set to THIRD in block 622, and control passes to the end of the loop through connector 612.

When STATE is THIRD, control passes to block 626 of FIG. 6(*b*). CNT_1 is compared against the buffer count on the channel indicated by CHANN. If they are identical, MIS_CH is set to CH_2, the state is set to MISMATCH in block 632, and control passes to the end of the loop through connector 612. If they are not identical, CNT_2 is compared against the buffer count on the channel indicated by CHANN. If they are identical, MIS_CH is set to CH_1, CNT_1 is set to CNT_2 so that it holds the count upon which two channels agree. The state is set to MISMATCH in block 632, and control passes to the end of the loop through connector 612. If these are not identical either, STATE is set to MULTI-MISMATCH to indicate that several channels had different buffer counts and control passes out of the loop through connector 642.

When STATE is MATCHED, control passes to block 646 of FIG. 6(*b*). CNT_1 is compared against the buffer count on the channel indicated by CHANN. If they are not identical, MIS_CH is set to CHANN, the state is set to MISMATCH in block 650, and control passes to the end of the loop through connector 612. If they are identical, no change is made to STATE, and control passes to the end of the loop through connector 612.

When STATE is none of the above, control passes to block 652 of FIG. 6(*b*). CNT_1 is compared against the buffer count on the channel indicated by CHANN. If they are not identical, STATE is set to MULTI-MISMATCH to indicate that several channels had different buffer counts and control passes out of the loop through connector 642. If they are identical, no change is made to STATE, and control passes to the end of the loop through connector 612.

FIG. 6(*c*) shows the actions taken at the end of each iteration of the loop after the branch through connector 612.

In block 658, it is determined whether there are other channels involved in the transfer which have not yet been examined. If so, CHAN is set to the next channel and control passes through connector 662 to the beginning of the loop (see FIG. 6(*a*)). If there are no more channels to examine, the STATE is checked in block 664. If STATE is MISMATCH, the channel causing the hang condition has been isolated and is given by MIS_CH. In block 666 MIS_CH is flagged as being the faulty channel. The system can then decide whether the DASD should be removed from operation, whether a retry should be allowed before removing the DASD from operation, or whether a hot spare should be used to replace the faulty DASD based on the same rules which are applied for hard errors detected by other means.

Control passes to block 668 if STATE has a value other than MISMATCH after all the channels have been examined or if execution leaves the loop through connector 642 because a MULTI-MISMATCH condition was detected. In these cases, there is no consensus among the buffers of the channels involved in the transfer. A channel reset is issued on each channel, and the system then performs limited retries without removing any of the DASDs from operation.

It will be apparent to those skilled in the art that the examples and embodiments described herein are by way of illustration and not of limitation, and that other examples may be used without departing from the spirit and scope of the present invention, as set forth in the appended claims.

I claim:

1. The process of detecting a channel containing a faulty storage device or faulty circuitry connecting a channel with synchronization hardware in a multiple storage device system in which storage devices are arrayed in at least three channels, and each channel is served by a single buffer which serves only that channel and is located between the storage devices and synchronization hardware, and all channels are synchronized by the hardware and connected to the hardware comprising the steps:

a. firstly, determining the byte count for each buffer,
   b. secondly, comparing the byte counts in each buffer,
   c. thirdly, determining the buffer whose byte count diverges most from the other buffer byte counts,
   d. finally, designating the channel with the buffer whose byte count diverges most from the other buffer byte counts as a channel containing a faulty storage device or faulty circuitry connecting the channel with the synchronization hardware.

2. The process of claim 1 wherein the storage devices are disks, tapes, or CDS which are connected to a dedicated controller unit containing the synchronization hardware.

3. The process of claim 1 wherein the storage devices are disks, tapes, or CDS which are connected to a host computer containing the synchronization hardware.

4. The process of claim 1 wherein the storage devices communicate over a SCSI, IDE, or Fiber Channel interface.

5. The process of claim 1 wherein at least one of steps a, b, c, or d is implemented in firmware on a microcontroller.

6. The process of claim 1 wherein at least one of steps a, b, c, or d is implemented in hardware.

7. The process of detecting a channel containing a faulty storage device or faulty circuitry connecting a channel with synchronization hardware in a multiple storage device system in which storage devices are arrayed in two channels, and each channel is served by a single buffer which serves only that channel and is located between the storage devices and synchronization hardware, and both channels are synchronized by the hardware and connected to the hardware, while in a read mode, comprising the steps:

a. firstly, determining the byte count for each buffer, b. secondly, comparing the byte counts in each buffer, c. thirdly, determining the buffer whose byte count is lowest, d. finally, designating the channel with the buffer whose byte count is lowest as a channel containing a faulty storage device or faulty circuitry connecting the channel with the synchronization hardware.

8. The process of claim 7 wherein the storage devices are disks, tapes, or CDS which are connected to a dedicated controller unit containing the synchronization hardware.

9. The process of claim 7 wherein the storage devices are disks, tapes, or CDS which are connected to a host computer containing the synchronization hardware.

10. The process of claim 7 wherein the storage devices communicate over a SCSI, IDE, or Fiber Channel interface.

11. The process of claim 7 wherein at least one of steps a, b, c, or d is implemented in firmware on a microcontroller.

12. The process of claim 7 wherein at least one of steps a, b, c, or d is implemented in hardware.

13. The process of detecting a channel containing a faulty storage device or faulty circuitry connecting a channel with synchronization hardware in a multiple storage device system in which storage devices are arrayed in two channels, and each channel is served by a single buffer which serves only that channel and is located between the storage devices and synchronization hardware, and both channels are synchronized by the hardware and connected to the hardware, while in a write mode, comprising the steps:

a. firstly, determining the byte count for each buffer, b. secondly, comparing the byte counts in each buffer, c. thirdly, determining the buffer whose byte count is highest, d. finally, designating the channel with the buffer whose byte count is highest as a channel containing a faulty storage device or faulty circuitry connecting the channel with the synchronization hardware.

14. The process of claim 13 wherein the storage devices are disks, tapes, or CDS which are connected to a dedicated controller unit containing the synchronization hardware.

15. The process of claim 13 wherein the storage devices are disks, tapes, or CDS which are connected to a host computer containing the synchronization hardware.

16. The process of claim 13 wherein the storage devices communicate over a SCSI, IDE, or Fiber Channel interface.

17. The process of claim 13 wherein at least one of steps a, b, c, or d is implemented in firmware on a microcontroller.

18. The process of claim 13 wherein at least one of steps a, b, c, or d is implemented in hardware.

19. The process of detecting a channel containing a faulty processing unit or faulty circuitry connecting a channel with synchronization hardware in a distributed processing system in which processing units are arrayed in at least three channels, and each channel is served by a single buffer which serves only that channel and is located between the processing units and synchronization hardware, and all channels are synchronized by the hardware and connected to the hardware comprising the steps:

a. firstly, determining the byte count for each buffer, b. secondly, comparing the byte counts in each buffer, c. thirdly, determining the buffer whose byte count diverges most from the other buffer byte counts, d. finally, designating the channel with the buffer whose byte count diverges most from the other buffer byte counts as a channel containing a faulty processing unit or faulty circuitry connecting the channel with the synchronization hardware.

20. The process of claim 19 wherein the processing units are in distributed processing nodes or multiprocessing subsystems.

21. The process of detecting a channel containing a faulty processing unit or faulty circuitry connecting a channel with synchronization hardware in a distributed processing system in which processing units are arrayed in two channels, and each channel is served by a single buffer which serves only that channel and is located between the processing units and synchronization hardware, and both channels are synchronized by the hardware and connected to the hardware, while in a read mode, comprising the steps:

a. firstly, determining the byte count for each buffer, b. secondly, comparing the byte counts in each buffer, c. thirdly, determining the buffer whose byte count is lowest, d. finally, designating the channel with the buffer whose byte count is lowest as a channel containing a faulty processing unit or faulty circuitry connecting the channel with the synchronization hardware.

22. The process of claim 21 wherein the processing units are in distributed processing nodes or multiprocessing subsystems.

23. The process of detecting a channel containing a faulty processing unit or faulty circuitry connecting a channel with synchronization hardware in a distributed processing system in which processing units are arrayed in two channels, and each channel is served by a single buffer which serves only that channel and is located between the processing units and synchronization hardware, and both channels are synchronized by the hardware and connected to the hardware, while in a write mode, comprising the steps:

a. firstly, determining the byte count for each buffer, b. secondly, comparing the byte counts in each buffer, c. thirdly, determining the buffer whose byte count is highest, d. finally, designating the channel with the buffer whose byte count is highest as a channel containing a faulty processing unit or faulty circuitry connecting the channel with the synchronization hardware.

24. The process of claim 23 wherein the processing units are in distributed processing nodes or multiprocessing subsystems.

* * * * *